US008899958B2

(12) United States Patent
Foppe

(10) Patent No.: US 8,899,958 B2
(45) Date of Patent: Dec. 2, 2014

(54) SHUTTLE FOR A FEEDBOX OF A BLOCK MACHINE

(75) Inventor: Norbert Foppe, Spelle (DE)

(73) Assignee: Rekers Verwaltungs-GmbH & Co. KG, Spelle (DE)

( * ) Notice: Subject to any disclaimer, the term of this patent is extended or adjusted under 35 U.S.C. 154(b) by 0 days.

(21) Appl. No.: 14/117,352

(22) PCT Filed: May 4, 2012

(86) PCT No.: PCT/EP2012/058216
§ 371 (c)(1),
(2), (4) Date: Feb. 10, 2014

(87) PCT Pub. No.: WO2012/156212
PCT Pub. Date: Nov. 22, 2012

(65) Prior Publication Data
US 2014/0147544 A1    May 29, 2014

(30) Foreign Application Priority Data

May 13, 2011    (DE) .......................... 10 2011 050 367

(51) Int. Cl.
*B28B 13/02*    (2006.01)
*B30B 15/30*    (2006.01)

(52) U.S. Cl.
CPC .............. *B28B 13/02* (2013.01); *B28B 13/0255* (2013.01); *B28B 13/0235* (2013.01); *B30B 15/30* (2013.01); *B28B 2013/024* (2013.01)
USPC .......................................... 425/447; 425/219

(58) Field of Classification Search
CPC  B28B 13/02; B28B 13/0235; B28B 13/0255; B28B 2013/024; B30B 15/30

USPC .......................................... 425/219, 447, 448
See application file for complete search history.

(56) References Cited

U.S. PATENT DOCUMENTS

| 70,585 A | * | 11/1867 | Long ............................ 425/202 |
| 151,492 A | * | 6/1874 | Hoyt ........................... 425/424 |

(Continued)

FOREIGN PATENT DOCUMENTS

| DE | 927560 C | 5/1955 |
| DE | 7600208 U1 | 5/1976 |

(Continued)

OTHER PUBLICATIONS

PCT International Search Report issued Aug. 2, 2012 on corresponding International Application No. PCT/EP2012/058216, including English Translation.

(Continued)

*Primary Examiner* — Yogendra Gupta
*Assistant Examiner* — Emmanuel S Luk
(74) *Attorney, Agent, or Firm* — Day Pitney LLP

(57) ABSTRACT

A shuttle for a feedbox of a block machine has a shuttle slide with shuttle rodding. The shuttle slide connects to the drive via a connecting rod. The connecting rod has an interconnecting bar, an articulated swing arm, and a driving reciprocating link connected to the drive. The interconnecting bar is attached to the shuttle slide via a first articulation and to the articulated swing arm via a second articulation. The articulated swing arm is attached to a static bearing via a third articulation. The driving reciprocating link is attached to the articulated swing arm via a fourth articulation.

16 Claims, 1 Drawing Sheet

(56) References Cited

U.S. PATENT DOCUMENTS

| | | | | |
|---|---|---|---|---|
| 171,453 | A * | 12/1875 | Wagner | 425/356 |
| 661,008 | A * | 10/1900 | Carlson | 425/448 |
| 1,336,598 | A * | 4/1920 | Throop | 271/85 |
| 1,424,469 | A * | 8/1922 | Gillard | 425/216 |
| 1,586,804 | A * | 6/1926 | Heskett | 425/219 |
| 1,690,422 | A * | 11/1928 | Muenzer | 425/212 |
| 1,765,064 | A * | 6/1930 | Eberling | 425/217 |
| 1,891,790 | A * | 12/1932 | Wilderman | 425/126.1 |
| 2,308,132 | A * | 1/1943 | Wellnitz | 425/139 |
| 2,314,577 | A * | 3/1943 | Dunn | 425/219 |
| 2,464,641 | A * | 3/1949 | Hearn, Jr. | 425/165 |
| 2,512,163 | A * | 6/1950 | Mallory | 222/310 |
| 2,514,971 | A * | 7/1950 | Reed | 425/432 |
| 2,562,541 | A * | 7/1951 | Flam et al. | 425/139 |
| 2,839,810 | A * | 6/1958 | Kovach | 425/200 |
| 2,957,221 | A * | 10/1960 | Zmania et al. | 425/145 |
| 2,957,222 | A * | 10/1960 | Zmania et al. | 425/219 |
| 3,055,075 | A * | 9/1962 | Stefanick | 425/413 |
| 3,184,818 | A * | 5/1965 | Crile | 425/135 |
| 3,213,511 | A * | 10/1965 | Petruzzi | 425/432 |
| 3,504,408 | A * | 4/1970 | Jones | 425/432 |
| 3,816,052 | A * | 6/1974 | Schoppee et al. | 425/406 |
| 3,885,900 | A * | 5/1975 | Kanta | 425/219 |
| 5,807,591 | A | 9/1998 | Aaseth et al. | |
| 6,177,039 | B1 * | 1/2001 | Aaseth et al. | 264/219 |
| 6,684,913 | B2 * | 2/2004 | Rivola | 141/1 |
| 8,562,327 | B2 * | 10/2013 | LaCroix et al. | 425/217 |
| 8,568,129 | B2 * | 10/2013 | LaCroix et al. | 425/449 |

FOREIGN PATENT DOCUMENTS

| | | |
|---|---|---|
| FR | 1261590 A | 5/1961 |
| JP | 53061618 | 6/1978 |
| JP | 2003127128 A | 5/2003 |

OTHER PUBLICATIONS

International Preliminary Report on Patentability issued Jun. 6, 2013 on corresponding International Application No. PCT/EP2012/058216, including English Translation.

* cited by examiner

SHUTTLE FOR A FEEDBOX OF A BLOCK MACHINE

CROSS-REFERENCE TO RELATED APPLICATIONS

This application is a U.S. national stage application under 35 U.S.C. 371 of International Application No. PCT/EP2012/058216, filed May 4, 2012, which claims priority to and the benefits of German Patent Application No. 10 2011 050367.6, filed May 13, 2011, each of which is incorporated by reference herein in its entirety.

BACKGROUND OF THE INVENTION

1. Field of the Invention

The present invention relates to a shuttle for a feedbox of a block machine, wherein the shuttle has a shuttle slide with a shuttle rodding and the shuttle slide is connected to a drive.

2. Description of the Related Art

Block machines are known in the prior art in manifold embodiments. Substantially, in a synchronized process a stone mould should be provided, a concrete mixture should be filled into the moulding cavities of the stone mould, the concrete mixture should be packed with a tamper and/or a vibrator, and subsequently the thus produced final concrete products, the so-called moulded articles, should be demoulded. Here, it has been proven successful to feed the block machines with bolster pallets and to lower upwards and downwards open stone moulds onto the bolster pallets. The concrete mixture is filled from concrete hoppers into one or more feedboxes and let from the feedboxes into the stone mould. Subsequently, the bolster pallet is vibrated with a vibration unit and/or a tamper is lowered into the stone mould. In this way, the concrete is packed in the stone mould. In the next step the tamper and the mould are lifted again and the bolster pallet with the moulded articles is taken out of the block machine.

Here, the quality and strength of the moulded articles strongly depend on the filling of the stone mould by the feedbox. Since the filling level related material pressure in the feedbox decreases during the travel of the feedbox and during the progressive filling of the stone mould, respectively, the rear moulding cavities in the filling direction are filled less. Thus, there is obtained an unintentional and declining filling curve over the width of the stone mould to be filled. This problem in particular arises when tall or slim stone moulds, respectively, are filled. The varying mass distribution over the stone mould as well as the resulting mass difference have a negative effect on the stone density and optics and may also have an interfering effect on the subsequent processes.

In order to minimize these problems as far as possible the employment of so-called shuttles has been proven successful. For that, a shuttle slide with a rodding substantially moves horizontally back and forth within the feedbox during the filling operation. This causes, that the raw material can be uniformly distributed into the stone mould. The movement of the shuttle slide takes place via a drive that is connected to the shuttle slide.

However, the shuttles known from the prior art have the drawback that the horizontal lifting component of the shuttle that can vary according to the width or length of the product, respectively, can only be adjusted at great expense or even not at all. Further, also the force necessary for the movement of the raw material is given by the physical properties of the raw material. Thus, a denser concrete requires a higher effort for movement. Also this can only partly be adjusted with the known shuttles or not at all. In the end, also with the shuttles known from the prior art there is an increased wear of the guides of the shuttle slide on the feedbox.

SUMMARY

Against this background, it is the object of the invention to provide a shuttle for a feedbox of a block machine without the previously described drawbacks.

The solution of the problem is achieved with a device according to the present invention. Suitable developments of the invention are described in the dependent claims.

The shuttle according to the invention differs from the initially described shuttles in that the shuttle slide is connected to the drive via a connecting rod. The connecting rod has an interconnecting bar, an articulated swing arm, and a driving reciprocating link connected to the drive. The interconnecting bar is attached to the shuttle slide via a first articulation. Via a second articulation the interconnecting bar is attached to the articulated swing arm, with the articulated swing arm being attached to a static bearing via a third articulation. The driving reciprocating link is attached to the articulated swing arm via a fourth articulation. This design has the advantage that a rotary motion of the drive is transmitted into a horizontal movement of the shuttle, since by the static bearing of the articulated swing arm as well as the further articulations substantially a degree of freedom is withdrawn from the system. In this way, the vertical force component of the shuttle slide is restricted which has a positive effect on the durability of the guides.

Further, a shuttle according to the invention has the advantage that vertical exciting of the mould via the pallet with the vibrator table unit for better filling of the stone mould with the raw material could be entirely omitted. Thus, the block machine under optimum conditions can even be operated with less expenditure of energy.

Suitably, the interconnecting bar and the articulated swing arm have at least two, preferably three coupling points for the second articulation. So the position of the articulations can be changed. This can be done by relatively simple replugging or recoupling of the articulation. By the change of the position the horizontal lifting component of the shuttle slide can be adjusted and at the same time also the force applied can be changed by a change of the lever path. In other words, the horizontal lifting and force component of the shuttle can be changed by a change of the quantities of motion.

Advantageously, the articulated swing arm has at least two coupling points for the fourth articulation. Thus, further setting possibilities for the horizontal lifting and force component by the change of the position of the articulation on the articulated swing arm result. With a suitable number and arrangement of coupling points thus, for example 3×2 different coupling options can result. If the position of the second and/or fourth articulations on the articulated swing arm is changed such that their distance to the third articulation is increased also the horizontal lifting component is increased. At the same time, in this way the horizontal force component is decreased. Consequently, the horizontal lifting component that can vary according to the width or length of the final product, respectively, can be adjusted without great expense. Moreover, with that the horizontal force component of the shuttle can be adapted to a number of different concrete mixtures. An adaption of the shuttle to a number of stone moulds and therefore also to the moulded articles to be produced thus is also possible without great expense.

Advantageously, the interconnecting bar has an L-shaped or T-shaped fish plate, with the coupling points for the second articulation being arranged in the area of the fish plate. Such an arrangement saves space and enables a simple and safe coupling of the interconnecting bar with the articulated swing arm.

Suitably, the driving reciprocating link is an eccentric swing arm. This has the advantage that via the eccentric swing arm a rotary motion is transmitted into a horizontal or straight movement, respectively.

In this way, a vertical lifting component and a vertical force component being accompanied therewith that would act on the guides of the shuttle slide are substantially avoided.

As the drive any conceivable drive such as electric motors or hydraulic motors can be used. Preferably, the drive is a hydraulic motor. Hydraulic motors have the advantage that they save space and have a high torque. With a hydraulic motor such a great force can be provided, as it is not possible with electric motors of the same size. Further, the engine speed for the hydraulic motor can be adjusted by means of a butterfly valve, for example. A further advantage of hydraulic motors is that the torque to be provided can be adjusted without changing the engine speed.

It is of advantage, if the articulations are designed as pin connections, in particular as socket pin connections and/or screw bolt connections. Pin connections enable a simple and fast recoupling of the articulations. Thus, by replugging the pins from one coupling point into another coupling point the horizontal lifting and force component of the shuttle slide can be adjusted in a simple manner. However, since the first and third articulations generally are not recoupled it is conceivable that these articulations are designed as threaded connections or the like.

Basically, a shuttle slide can be arranged in an arbitrary manner in the feedbox, e.g. also one or two shuttle slides can be arranged on the left and/or on the right. Advantageously, one shuttle slide is arranged centrally in the feedbox. The central arrangement of the shuttle slide results in an optimum effect on the raw material and thus, a uniform filling of the moulding cavities of the stone mould by the movement of the shuttle.

Preferably, the shuttle slide is guided horizontally in a slide guide, e.g. a slide bush, linear ball guide etc. Due to the reduction of the vertical force component according to the invention here, a slide guide can be used that does not need additional lubricants.

It is of advantage, if the shuttle rodding is detachably attached to the shuttle slide. This has the advantage that by relocation or replacement of the rodding of the shuttle a further product-specific adaption can be done. This further increases the variability and quality in view of the filling of the moulding cavities with raw material.

In the following, the invention is explained in detail with the help of an example shown in the drawing. There:

DETAILED DESCRIPTION

Figure 1:
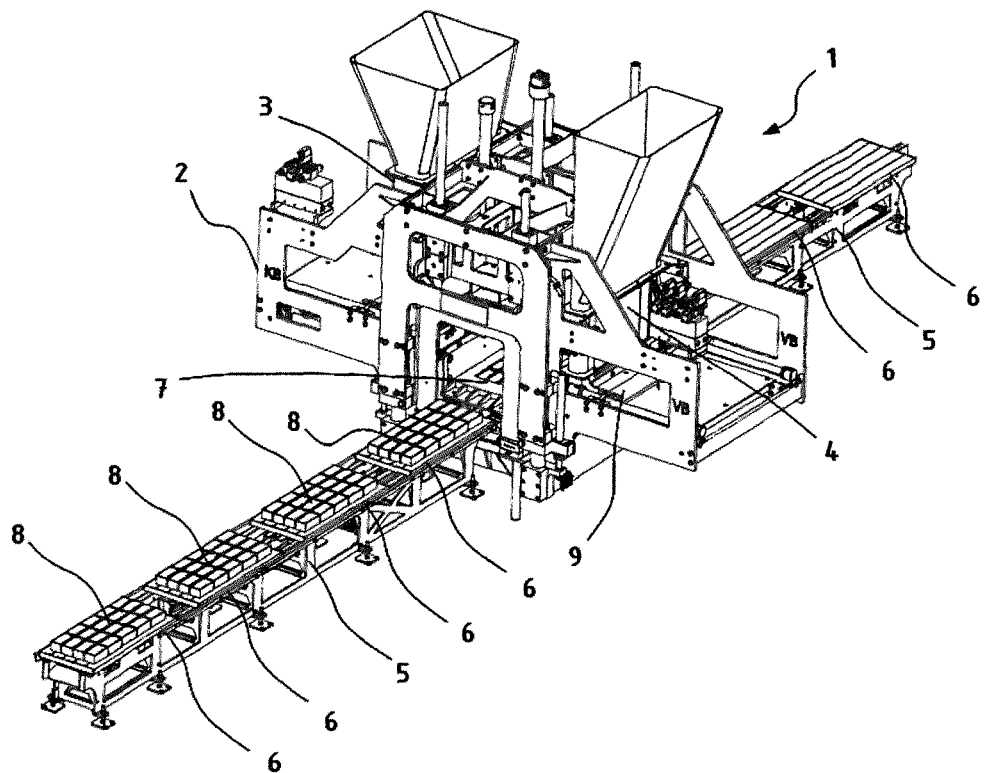
FIG. 1 schematically shows a perspective view of a block machine.

In FIG. 1 there is represented a block machine 1 in a perspective view. The block machine 1 comprises a movable main frame 2 attached and guided on a static frame 32 and at which two concrete hoppers 3, 4 are laterally arranged. The first hopper 3 serves to receive the so-called coarsemix and the second hopper 4 serves to receive the so-called facemix. Since the facemix is generally applied as a thin cover layer to the coarsemix the facemix hopper 4 has a smaller volume than the coarsemix hopper 3.

The block machine 1 is intermittently fed with bolster pallets 6 via a conveyor 5. The bolster pallets 6 come to a halt on a vibrator table 7 centrally arranged in the block machine 1 and serve to receive the moulded articles 8.

Below the concrete hoppers 3, 4 each a feedbox 9 is arranged that is represented in more detail in FIG. 2. The feedbox 9 is filled with concrete from the hoppers 3, 4 via a filling device and moved via a drive towards the standing bolster pallet 6 or vibrator table 7, respectively. There, the concrete in the feedbox is poured into the moulding cavities of a stone mould lowered onto the bolster pallet 6.

After the stone mould has been filled with concrete from the feedbox 9 the concrete in the stone mould can be packed via a tamper and/or by moving the vibrator table 7. For that, the vibrator table 7, as shown in FIG. 2, is attached to the static frame 32 of the block machine 1 via elastic metals 30. The movement of the vibrator table 7 is performed by two unbalance vibrators 31 arranged below the vibrator table 7. In this example, the unbalance vibrators 31 have opposite rotary directions, as is indicated by the corresponding arrows.

Subsequently, the stone mould is lifted and the bolster pallet 6 with the moulded articles 8 is taken out via the conveyor 5.

Figure 2:
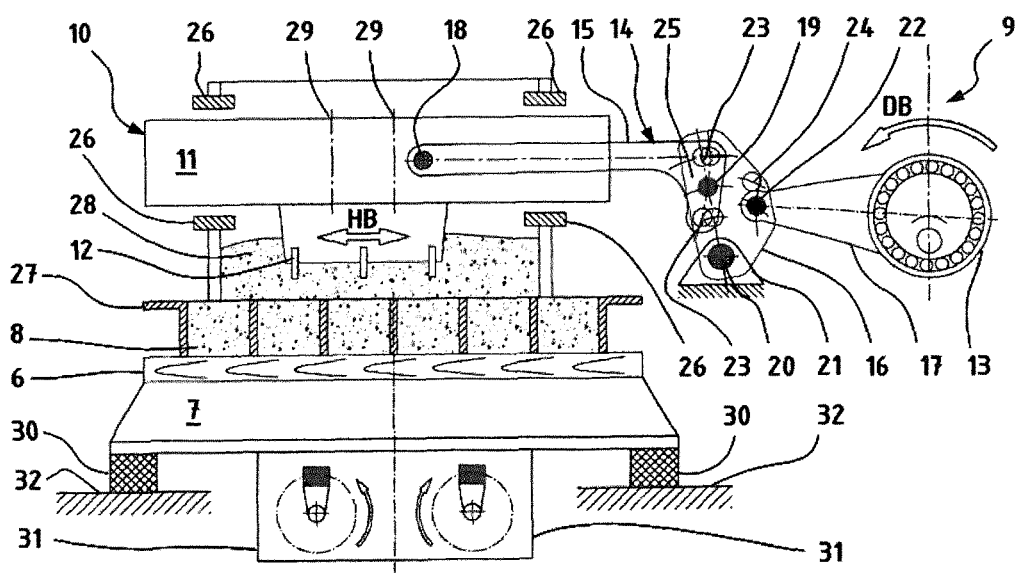
FIG. 2 schematically shows a side view of a feedbox with a shuttle according to the invention.

As already mentioned, FIG. 2 shows a feedbox 9 with a shuttle 10 according to the invention that is employed in the block machine 1 shown in FIG. 1. The shuttle 10 has a shuttle slide 11 and a shuttle rodding 12 and is centrally arranged in the feedbox 9. For moving the shuttle 10 it is connected to a drive 13 via a connecting rod 14.

The connecting rod 14 comprises an interconnecting bar 15, an articulated swing arm 16, and a driving reciprocating link 17 connected to the drive 13 and designed in the form of an eccentric swing arm. The interconnecting bar 15 is connected to the shuttle slide 11 via a first articulation 18 and is connected to the articulated swing arm 16 via a second articulation 19. The articulated swing arm 16 is rotatably connected to a static bearing 21 by a third articulation 20. The static bearing 21 is part of the frame of the feedbox 9.

By a fourth articulation 22 the articulated swing arm 16 is connected to the driving reciprocating link 17.

For use as a drive 13 a hydraulic motor is particularly suitable that can provide a high torque of 900 Nm with a small size.

The shuttle slide 11 is horizontally guided in slide guides 26 designed as a slide bush that are arranged on the frame of the feed box 9. By the described arrangement a rotary motion DB generated by the drive 13 is converted to a horizontal movement HB of the shuttle slide 11, as is also indicated by the corresponding arrows.

In order to be able to adjust the horizontal lifting and force component of the shuttle slide 11 the interconnecting bar 15 and the articulated swing arm 16 have three coupling points 23 for the second articulation 19. For that, the interconnecting bar 15 has an L-shaped fish plate 25 at its the drive 13 facing end, in the area of which the coupling points 23 of the second articulation 19 are arranged. For that, the articulated swing arm 16 has corresponding coupling points 23. Further, the articulated swing arm 16 has two coupling points 24 for the fourth articulation 22. In the illustration according to FIG. 2 the interconnecting bar 15 is coupled to the articulated swing arm 16 at the central coupling point 19. Further the driving reciprocating link 17 is coupled to the articulated swing arm 16 at the lower coupling point 24. In order to enable a fast relocation of the second and fourth articulations 19, 22 these are designed as socket pin connections with detachable securing means. The simple relocation of the socket pins of the articulations 19, 22 thus results in 3×2 transmission options of the rotary motion DB of the drive 13 into a horizontal movement HB of the shuttle slide 11 and into the horizontal force component of the shuttle slide 11, respectively.

Assuming a uniform engine speed and a uniform torque of the drive 13 according to the width and length of the stone mould 27 used, respectively, the horizontal lifting and force component of the shuttle slide 11 can be changed. For example, the horizontal lifting component of the shuttle slide 11 can be reduced by replugging the connecting pin of the second articulation 19 into the lowest coupling point 23. At the same time, as a result the horizontal force component is increased.

The contrary is obtained when the connection pin of the second articulation 19 is replugged into the uppermost coupling point 23. The horizontal lifting component is increased with the horizontal force component being decreased at the same time.

Said horizontal movement HB of the shuttle slide 11 causes that the raw material 28 can optimally and uniformly be distributed into the moulding cavities of the stone mould 27 lowered to the bolster pallet 6. In this example, the stone mould 27 has six moulding cavities per row, however, the shuttle 10 according to the invention can flexibly be adjusted to a number of stone moulds 27 with variable width, length, depth, and number of moulding cavities.

The shuttle rodding 12 can be detached from the shuttle slide 11 by detaching the connections 29 and thus, replaced, relocated, or adjusted in height, by which the variability and flexibility of the shuttle 10 according to the invention is increased again. For example, the connections 29 between the shuttle slide 11 and the shuttle rodding 12 can be designed as screw connections or the like.

LIST OF REFERENCE NUMBERS

1 Block Machine
2 Movable Main Frame
3 Coarsemix Hopper
4 Facemix Hopper
5 Conveyor
6 Bolster Pallet
7 Vibrator Table
8 Moulded Article
9 Feedbox
10 Shuttle
11 Shuttle Slide
12 Shuttle Rodding
13 Drive
14 Connecting Rod
15 Interconnecting Bar
16 Articulated Swing Arm
17 Driving Reciprocating Link
18 First Articulation
19 Second Articulation
20 Third Articulation
21 Static Bearing
22 Fourth Articulation
23 Coupling Point
24 Coupling Point
25 Fish Plate
26 Slide Guide
27 Stone Mould
28 Raw Material
29 Connection
30 Elastic Metal
31 Unbalance Vibrator
32 Static Frame
DB Rotary Motion
HB Horizontal Movement

The invention claimed is:

1. A shuttle for a feedbox of a block machine, comprising: a shuttle slide with a shuttle rodding, wherein the shuttle slide is connected to a drive, wherein the drive is configured for performing a rotary motion via a connecting rod and wherein the connecting rod includes: an interconnecting bar, an articulated swing arm, and a driving reciprocating link connected to the drive, wherein the interconnecting bar is attached to the shuttle slide via a first articulation, and the interconnecting bar is attached to the articulated swing arm via a second articulation, and wherein the articulated swing arm is attached to a static bearing via a third articulation, and wherein the driving reciprocating link is attached to the articulated swing arm via a fourth articulation and configured for transmitting rotary motion of the drive into a horizontal movement of the shuttle slide, said horizontal movement of the shuttle slide configured to provide uniform distribution of a material into a booster pallet and restrict a vertical force component of the shuttle slide to increase durability of the shuttle slide.

2. The shuttle according to claim 1, wherein the interconnecting bar and the articulated swing arm have at least two-coupling points for the second articulation.

3. The shuttle according to claim 1 wherein the articulated swing arm has at least two coupling points for the fourth articulation.

4. The shuttle according to claim 2, wherein the interconnecting bar has an L-shaped or T-shaped fish plate, wherein the coupling points for the second articulation are arranged in the area of the fish plate.

5. The shuttle according to claim 1, wherein the driving reciprocating link is an eccentric swing arm.

6. The shuttle according to claim 1, wherein the drive is one of a hydraulic motor and an electric motor.

7. The shuttle according to claim 1, wherein the articulations are pin connections.

8. The shuttle according to claim 1, wherein the shuttle slide is centrally arranged in the feedbox.

9. The shuttle according to claim 1, wherein the shuttle slide is horizontally guided in a slide guide.

10. The shuttle according to claim 1, wherein the shuttle rodding is detachably attached to the shuttle slide.

11. The shuttle according to claim 1, wherein the interconnecting bar and the articulated swing arm have three coupling points for the second articulation.

12. The shuttle according to claim 2, wherein the articulated swing arm has at least two coupling points for the fourth articulation.

13. The shuttle according to claim 3, wherein the interconnecting bar has an L-shaped or T-shaped fish plate, wherein the coupling points for the second articulation are arranged in the area of the fish plate.

14. The shuttle according to claim 1, further comprising a vibrator table, connected to said shuttle slide, configured to move underneath a booster pallet placed thereon for even distribution of the material in the booster pallet.

15. The shuttle according to claim 14, wherein the movement of the vibrator table is configured to be performed by two vibrators arranged below the vibrator table.

16. The shuttle according to claim 15, wherein the two vibrators have opposite rotary directions.

\* \* \* \* \*